(No Model.) 4 Sheets—Sheet 4.
J. R. DAVIES.
MOLD FOR CASTING.
No. 332,503. Patented Dec. 15, 1885.
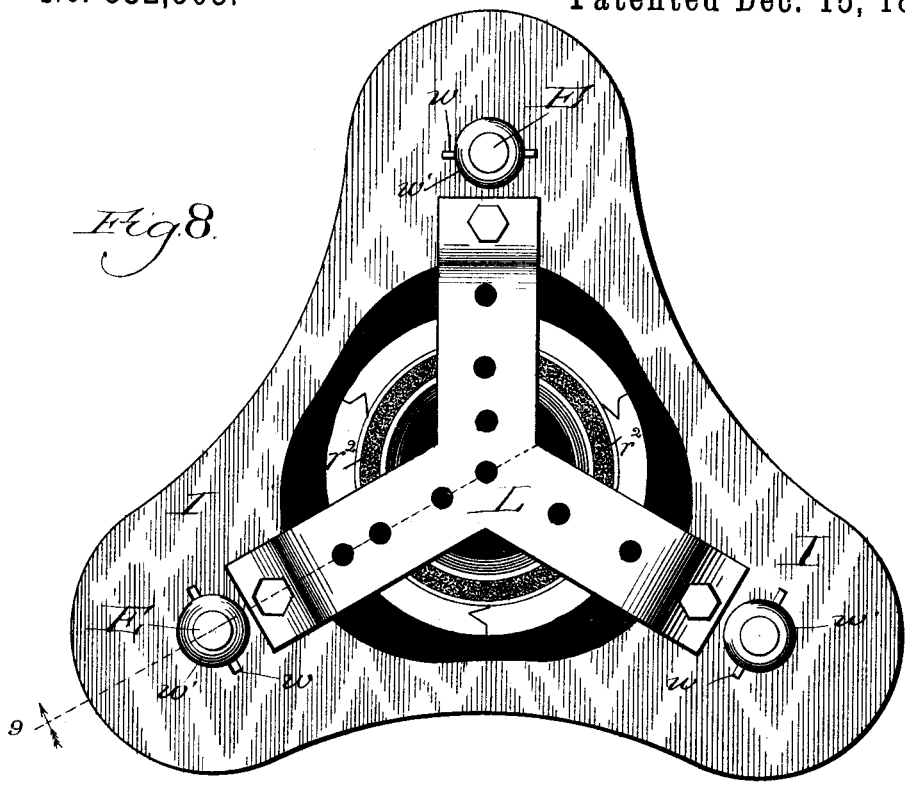
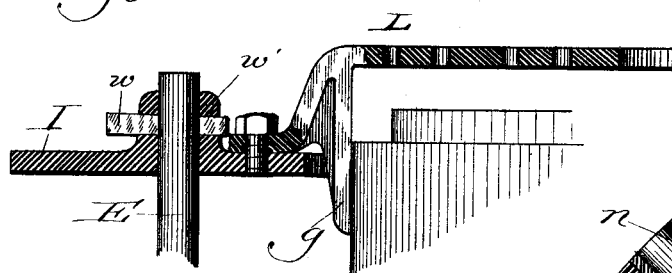
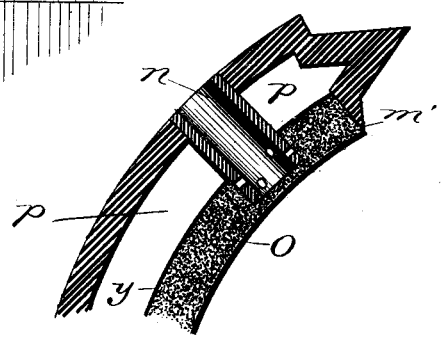
Witnesses:
Chas E Gaylord.
Mason Bross.
Inventor:
John R. Davies,
By Dyrenforth and Dyrenforth,
Att'ys.

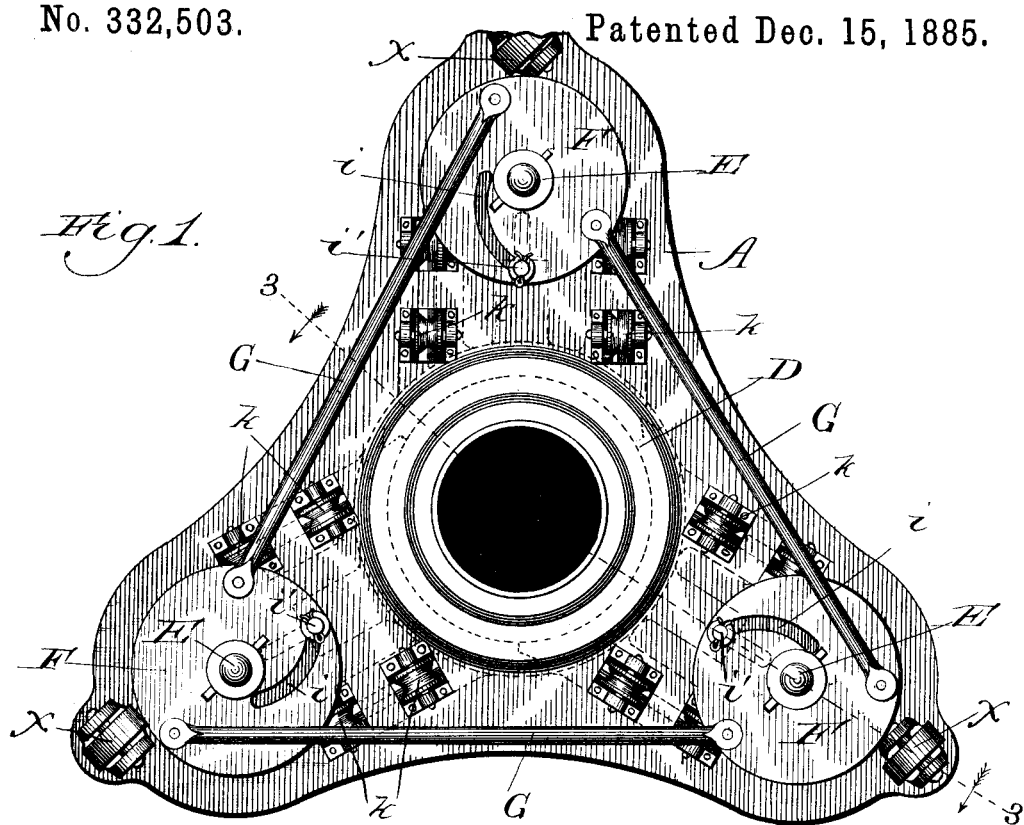

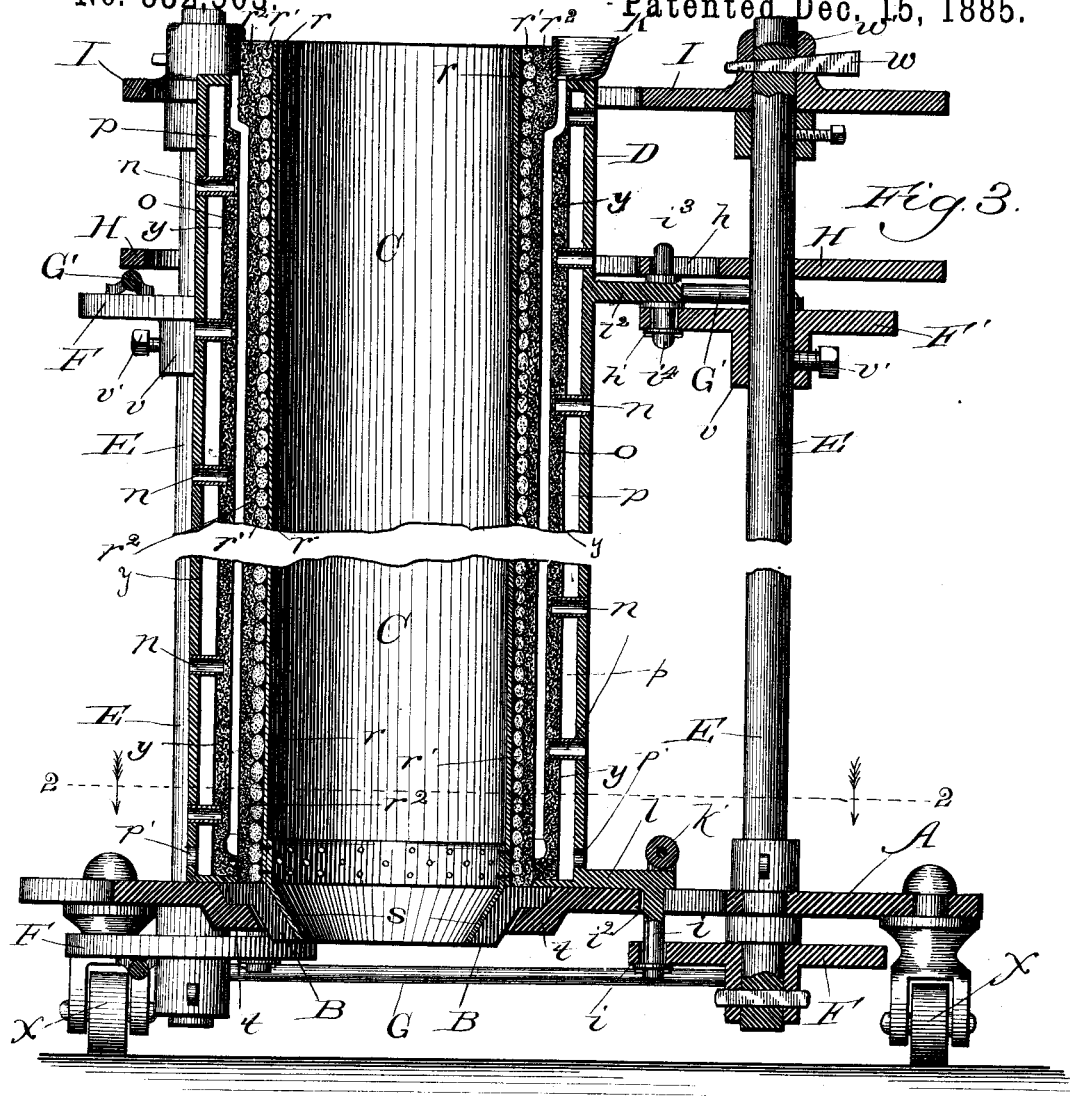

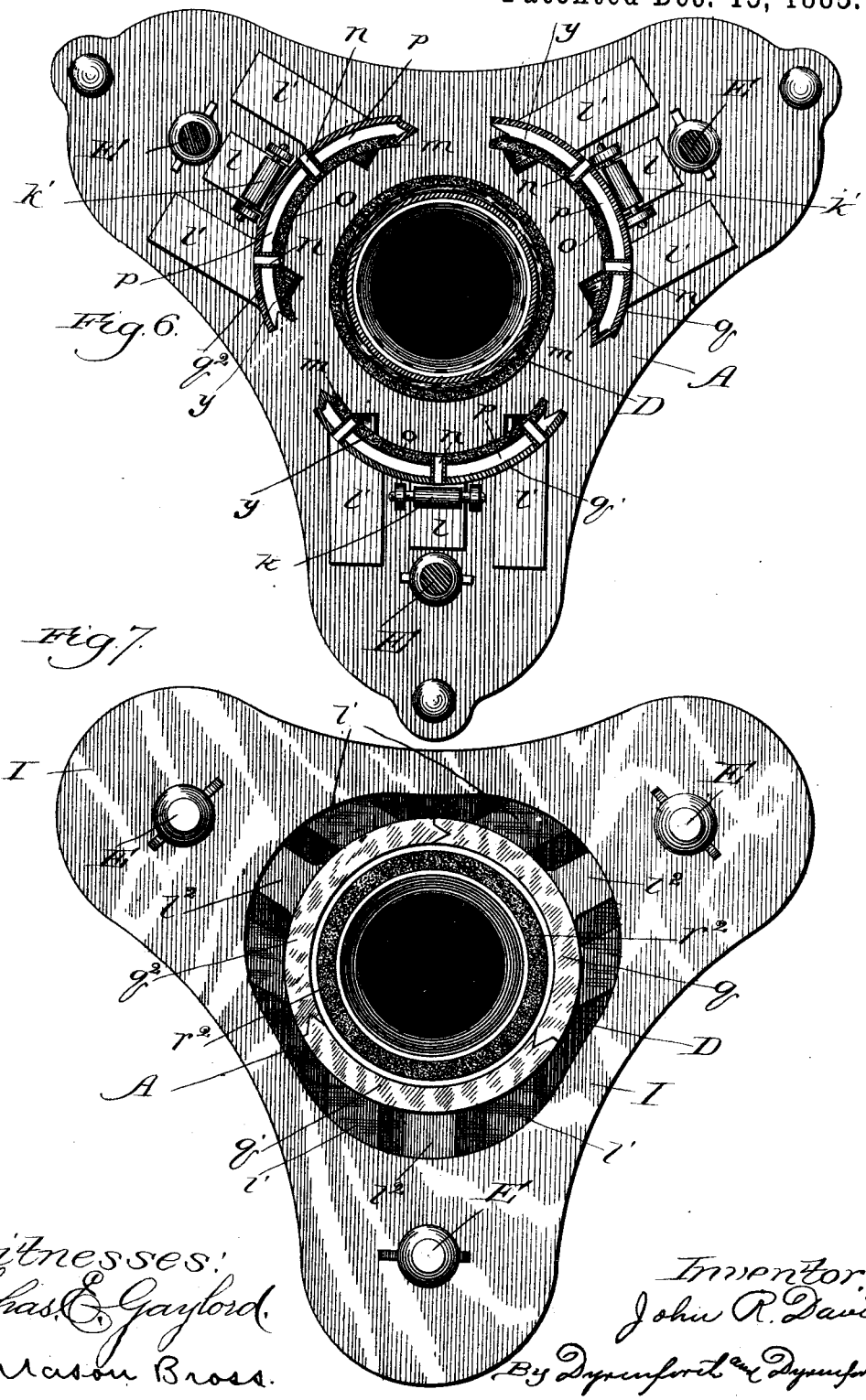

ically light weight.
UNITED STATES PATENT OFFICE.

JOHN R. DAVIES, OF CHICAGO, ASSIGNOR OF ONE-HALF TO WM. W. FLINN, OF HIGHLAND PARK, ILLINOIS.

MOLD FOR CASTING.

SPECIFICATION forming part of Letters Patent No. 332,503, dated December 15, 1885.

Application filed August 22, 1885. Serial No. 175,038. (No model.)

*To all whom it may concern:*

Be it known that I, JOHN R. DAVIES, a citizen of the United States, residing at Chicago, in the county of Cook and State of Illinois, have invented certain new and useful Improvements in Molds for Casting; and I hereby declare the following to be a full, clear, and exact description of the same.

My invention relates to an improvement in the art of casting metals of the nature of the invention entitled "improvement in molds for casting," for which Letters Patent of the United States No. 131,214 were granted to me September 10, 1872.

The invention described and claimed in the aforesaid Letters Patent, as also that forming the subject of another application by myself, of even date herewith, and comprising an improvement upon the construction shown and described in the Letters Patent referred to, are designed for casting objects of narrow diameters and comparatively light weight.

The purpose to which the aforesaid inventions are applied permits the employment of a series or cluster of sectional molds upon a base-plate and a central shaft connected with the sections of the molds by suitable mechanism to permit the same to be actuated simultaneously by oscillating the shaft. For the casting of large and heavy objects, however, of comparatively great diameter, requiring ponderous molds of large size, it is impracticable to provide them in clusters and cause their sections to be simultaneously separated and closed by actuating for the purpose a central shaft connected with the sections by means of mechanism in the manner shown in the Letters Patent and application for Letters Patent aforesaid.

It is my object to provide a construction of sectional mold adapted for the production of large castings; and to this end my invention consists in the general construction whereby this object is effected, and also in details of such construction and combinations of parts forming the same, all as hereinafter more particularly set forth and claimed.

Referring to the drawings, Figure 1 is a bottom plan view of a base-plate supporting centrally a sectional mold and showing mechanism for opening and closing the sections; Fig. 2, a sectional plan view of the device, taken on the line 2 2 of Fig. 3, and having one detail broken away to display another detail; Fig. 3, a vertical sectional view of the device; Fig. 4, a sectional view taken on the line 4 4 of Fig. 2, viewed in the direction of the arrows, and showing details of the mechanism employed in actuating the sections of the mold; Fig. 5, a sectional view taken on the line 5 5 of Fig. 4, viewed in the direction of the arrows, and showing a side elevation of the mechanism illustrated in Fig. 4; Fig. 6, a sectional plan view similar to that shown in Fig. 2, but illustrating the sections of the mold as opened; Fig. 7, a plan view with the pouring-dish omitted; Fig. 8, a plan view similar to that represented in Fig. 7, but showing an auxiliary detail in the form of a detachable clamping device, to serve in assisting to hold the sections together and afford means to permit the core to be anchored, or in some cases suspended, in the mold; Fig. 9, a sectional view taken on the line 9 9 of Fig. 8, representing the clamping device in side elevation; and Fig. 10, a horizontal sectional view of a section of the mold, showing the construction of the same to produce sand-cleats affording lateral confines for the lining-space of the section.

A designates the base-plate, supported on rollers $x$, and having, by preference, the form shown, and provided centrally with a circular opening constructed to afford a seat, $t$, (see Fig. 3,) constituting a support for a ring, B, to carry the core-bar S. The ring is readily removable, and may be supplanted by another of greater or smaller internal diameter, to carry a larger or smaller core, when desired, for the same mold.

C is the core, comprising the usual metallic cylinder, $r$, wound on its external surface with straw rope $r'$, covered with a plastic substance, $r^2$, molded to the desired form and hardened by drying.

D is the mold, supported on the bed-plate A around the central opening therein. The mold D comprises sections, preferably three in number, as shown at $q$, $q'$, and $q^2$, these sections being all constructed alike, each with, preferably, V-shaped joints in the form of projections and recesses at its opposite edges, and an inclosed cooling-space, $p$, constituting the interior of each shell-like section, and having openings $p'$, for the introduction of the cooling medium, which serves to permit control of the temperature of each section and consequent unequal expansion and contraction, which would interfere with a proper adjustment of the joints, and a space for the lining $o$, which comprises, preferably, the materials mentioned in my aforesaid Letters Patent, applied to the inner wall, $y$, of the shell portion of the mold, and treated in the manner therein stated, to permit the mold to be operated continuously. Vent-tubes $n$, perforated at their inner extremities, extend from the outer surface of each section through the shell into the lining-space, and afford means for the escape of gas and steam generated in the drying of the lining, besides assisting in holding the lining in place, and the edges of the lining-space are provided with confines in the form of "sand cleats" or "ribs" $m$.

Each section of the mold is provided at its lower extremity with lateral flanges $l$ and $l'$, the latter of which are V-shaped longitudinally, as shown in Fig. 4, on their lower surfaces, and project downward into slots formed in the base-plate A, into which slots, from the under side of the plate, rollers $k$ extend, supported in suitable bearings, and having V-shaped peripheries to receive and form guides for the flanges $l'$. A roller, $k'$, is supported in bearings in the upper surface of the base-plate or each central flange, $l$, to steady the sections in their movement produced in a manner hereinafter described.

E E are oscillating shafts (one being provided for each section of the mold) projecting through and supported on the base plate in line with central flanges, $l$. A disk, F, is secured upon each shaft toward its lower extremity below the bed-plate, which shields the operating mechanism from danger of the falling upon it of molten metal, which might interfere with its operation. Each disk is provided with a curved slot, $i$, properly proportioned to permit movement of a section to a desired limit, and a pin, $i'$, extends through each slot $i$ into an adjacent central flange, $l$, in which it is secured through a radial slot, $i^2$, in the bed-plate, in which the pin $i'$ moves. The disks F are connected together toward their peripheries by means of rods G, as clearly shown in Fig. 1.

Toward the upper end of the mold D each section is provided with a flange, $l^2$, (see Fig. 3,) in vertical line with the flange $l$ toward the lower extremity of the same, and which is provided with an upward-projecting pin, $i^3$, which extends through a slot, $h$, in a plate, H, surrounding the shafts E and supported upon the flanges $l^2$, and provided with a central opening of the form shown in Fig. 7, which represents a plate, hereinafter described, to afford recesses to receive the sections when separated and permit their separation. From the lower side of each flange $l^2$ a pin, $i^4$, extends through a slot, $h'$, in a disk, F', which slot $h'$ is in form like the slots in a disk, F, and directly above it. A disk, F', is provided for each shaft E, and is secured thereon to oscillate with it by means of a collar, $v$, which may form an integral part of the disk, as shown, and a set-screw, $v'$. The disks F' are preferably connected together by means of rods G' in the manner of the disks F.

I is the upper plate, in form resembling the plate H, and supported upon the shafts E by means of cotters, collars, and set-screws, as shown. The plate I is secured firmly in position when the sections of the mold are closed by means of cotters $w$, which pass through the shafts E, and bosses $w'$, formed on the plate.

The manner of operating the mold is apparent without elaborate description of the same. By turning the shaft E in one direction, which may be accomplished by the aid of a suitable lever, the sections of the mold may be closed and the molten metal poured through a suitable dish, K, into the space provided for its reception, which extends, of course, entirely around the mold; and to remove the casting, which is effected by the aid of a derrick, crane, or similar device for the purpose, the sections are separated by turning the same shaft E in the opposite direction. Owing to the connection of the disks on the shafts, the turning of one of the latter will obviously turn the others at the same time.

A clamping device, L, may be provided to assist in holding the sections together when closed and subjected to the strain incident to the proceeding of casting. Such a device is shown in Figs. 8 and 9, and comprises a crown formed of three metallic arms, to be bolted upon the plate I in a position to bring its center coincident with that of the mold, and provided with projections $g$, Fig. 9, extending downward in contact with the surfaces of the sections. Holes are provided in the crown— one in its center and others irregularly in the arms forming it, the former to receive a bolt or screw for suspending the core in the mold, (in casting shells for heavy ordnance, for instance,) and the others or some of them to receive screw-bolts for anchoring the core.

Other means than the particular mechanism herein described for simultaneously actuating the sections of the mold may be employed without departing from my invention, and I have invented several devices for the purpose, which will form subjects for future applications for patents.

What I claim as new, and desire to secure by Letters Patent, is—

1. The combination, with a base-plate, A, provided with an opening, of a mold for casting metals, composed of three or more laterally-adjustable sections supported on the base-plate around the opening therein, vertical shafts supported on the base-plate around the mold, one for each section, and mechanism, substantially as described, connecting the shafts and sections, whereby the sections shall be opened and closed by oscillating any one of the shafts, as set forth.

2. The combination of a base-plate, A, provided with a central opening, a mold composed of three or more laterally-adjustable sections surrounding the central opening in the base-plate, and having flanges $l$ and flanges $l'$, V-shaped on one surface, shafts supported upon the base-plate, one for each section, slotted disks F, secured upon the shafts and connected with the flanges $l$ of the sections, and connected together to cause the movement of one simultaneously to move the others, and rollers $k$, supported in bearings upon the base-plate having V-shaped peripheries, to receive and afford guides for the flanges $l'$, substantially as described.

3. The combination of a base-plate, A, provided with a central opening, a mold composed of three or more laterally-adjustable sections surrounding the central opening in the base-plate, and having toward their lower extremities flanges $l$ and flanges $l'$, V-shaped on one surface and provided toward their upper extremities with flanges $l^2$, shafts E, supported upon the base plate, one for each section, slotted disks F, secured upon the shafts toward their lower extremities and connected with the flanges $l$ of the sections, and connected together to cause the movement of one simultaneously to move the others, rollers $k$, supported in bearings upon the base-plate having V-shaped peripheries, to receive and afford guides for the flanges $l'$, slotted disks F' upon the shafts E toward their upper extremities, and connected with the flanges $l^2$ by means of pins $i^4$, and a plate, H, surrounding the shafts E and mold, and supported upon the flanges $l^2$, provided with guide-pins $h$, projecting through the slots in the plate H, the whole being constructed and arranged to operate substantially as described.

4. The combination, with a mold composed of laterally-adjustable sections, of a crown, L, detachably supported over the mold and provided with projections $g$, to clamp the sections, and with holes, substantially as and for the purpose set forth.

JOHN R. DAVIES.

In presence of—
 WILLIAM W. FLINN,
 MASON BROSS.